April 29, 1958 R. ROUSSE 2,832,148
RAILROAD TRACK GAUGING APPARATUS
Filed April 7, 1954 2 Sheets-Sheet 1
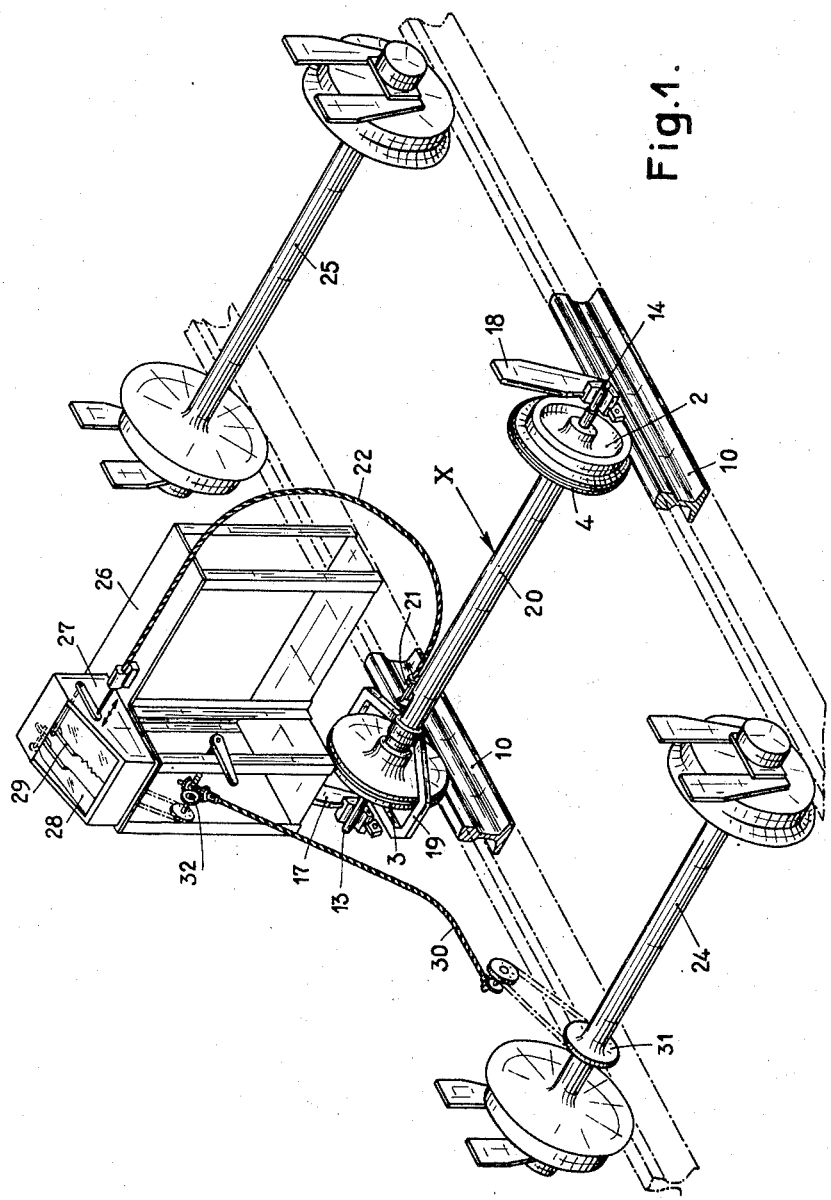
INVENTOR
ROBERT ROUSSE
BY
Kane, Dalsimer and Kane
ATTORNEYS

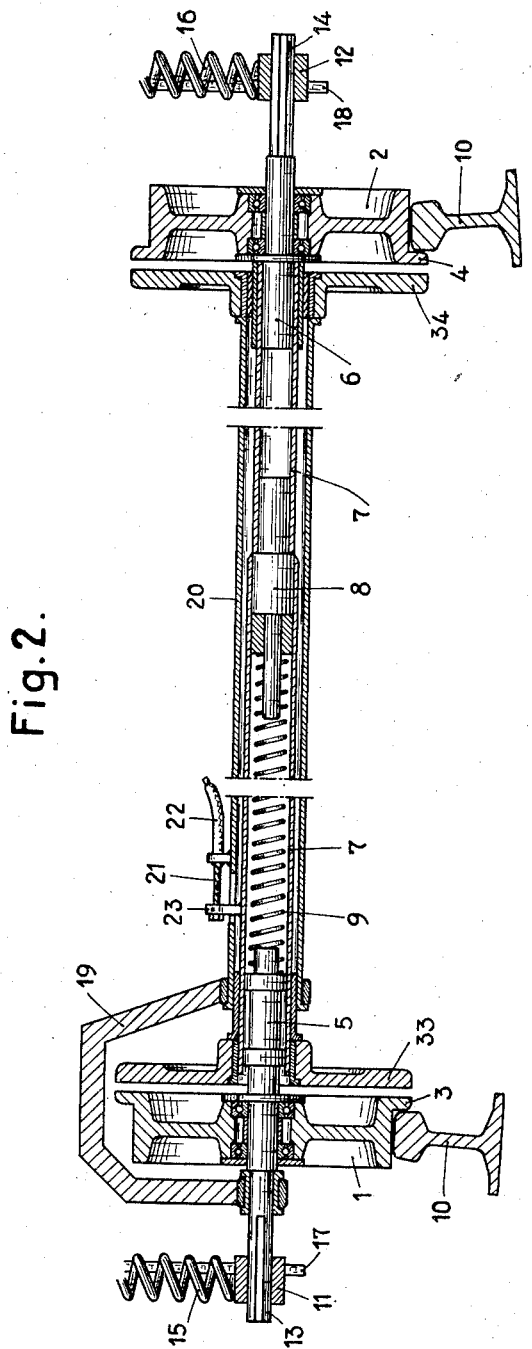

United States Patent Office 2,832,148
Patented Apr. 29, 1958

2,832,148
RAILROAD TRACK GAUGING APPARATUS

Robert Rousse, Argenteuil, France, assignor to Materiel Industriel S. A., Lausanne, Switzerland, and Constructions Mecaniques S. A., Renens, Switzerland, as joint owners Application April 7, 1954, Serial No. 421,592

Claims priority, application France April 22, 1953

3 Claims. (Cl. 33—144)

The measurement and continuous recording of the track gauge of a railway track are at present effected by means of sensing organs which come into contact with the inside surface of the rail heads of the track's two lines of rails. The determination of the differences in the distance between the points of contact of the two connected sensing organs enables the distance between the lines of rails to be measured and indicates its variations.

These sensing organs are necessarily of small dimensions so that they can pass over the grooves of switch gear or level crossings without any damage being caused. For this reason they are difficult to attach, they are generally fragile and they are detrimentally affected by the slightest obstacle, such as a stone in a level-crossing groove, or when passing over gaps in frog-points or railway crossings. In addition, they come into contact with the side of the leading arms of the electrical contacts located inside the track, damage them and thus cause trouble.

The object of the present invention is to remedy these drawbacks and, in addition, to permit measuring and recording the track gauge of a railway track at a relatively high speed, limited only by the inertia of the component parts, and with a practically insignificant margin of error, with the aid of means approximately resembling a normal axle, that is to say, an axle which is very compact in form and has no fragile organs extending beyond its template.

To this end, the device according to the present invention comprises an axle, each cylindrically tyred wheel of which is supported by one of two telescopic, concentric arbors which an elastic organ repels in the direction in which the flanges of the said wheels are pressed against the inside surface of the rail heads, each of the said arbors being connected to a disk which is of the same external diameter as the said flanges and is located on the inside and immediately adjacent to the flange of the wheel supported by the other arbor, the thickness of each wheel flange being reduced to such an extent that when the said thickness is added to the thickness of the disk attached to the said flanges, the resultant total practically corresponds to the thickness of a normal flange, means being provided to measure, transmit and record the distance between the wheels.

The annexed drawing illustrates a typical embodiment of the objects of the invention given by way of example.

Fig. 1 is a view in perspective of the device as a whole; Fig. 2 is an axial section of the telescopic axle, the principal measuring element.

I shall begin by describing the latter.

It comprises the two cylindrically tyred wheels 1 and 2, together with their flanges 3 and 4, each wheel being supported by an arbor end 5 or 6 respectively.

The arbor end 6 is integral with a tube 7 which is in two sections of different diameter and interconnected by the plug 8.

The arbor end 5 of the wheel 1 slides axially in the tube 7 which is integral with the arbor of the wheel 2, the whole unit thus constituting an axle with two telescopic arbors (5 and 6–7). A helical spring 9 is interposed between the plug 8 and the arbor end 5 tends to move the wheels axially away from each other by repelling them in the direction in which their flanges are pressed against the inside surface of the heads of the two lines of rails 10 of the track to be measured.

It is clear that the wheels 1 and 2, when pressed thus against the rails, will provide, by the distance between them, a measurement of the track gauge of the considered track.

The axle described is supported by the axle boxes 11 and 12, in which the journals 13 and 14 may slide but not turn, and by the springs 15 and 16 as well as by the axle guards 17 and 18.

The springs 15 and 16, mounted beneath the chassis of the measuring vehicle, will be arranged and dimensioned so that they load the axle sufficiently to prevent its wheels from rebounding, but do not offer any resistance to the action of the spring 9.

Connected to the journal 13 is a stirrup 19 containing the wheel 1, behind which the said stirrup is connected to a sleeve 20 surrounding the telescopic arbor already described.

As this sleeve thus moves axially along with the journal 13, the arbor end 5 and consequently the wheel 1, whereas the tube 7 moves axially along with the arbor end 6 and consequently the wheel 2, the relative position of the sleeve and the tube is a measurement of the axial distance between the said wheels.

In this embodiment the variations of this measurement are transmitted to recording apparatus by means of a cable 21 sliding in a sheath 22. Whereas the said sheath is integral with the sleeve 20, an arm 23, passing through a slot in the said sleeve, connects the cable to the tube 7.

Fig. 1 shows how recording is effected.

The telescopic axle of Fig. 2, which has just been described, is located at x, between two normal axles 24 and 25 of a vehicle which is not illustrated and is travelling along the lines of rails 10.

The principal elements referred to in Fig. 2 are also shown in Fig. 1, excessive overloading of the drawing being, however, avoided.

The cable 21 and the sheath 22 terminate at a desk 26 which carries the recording apparatus 27, the paper strip 28 of which advances under the recording pen 29 as a function of the vehicle's displacement, which is achieved by means of the transmission flex 30 driven from a pulley 31 of the axle 24.

A mechanism is provided at 32 for reversing the direction of rotation communicated to the transmission flex and its purpose is to ensure that the strip 28 maintains its direction of movement independently of the direction of travel of the vehicle carrying the device.

Reverting to Fig. 2, there can be seen immediately behind each wheel 1 and 2, disks 33 and 34 respectively which have the same diameter as the wheel flanges and a thickness such that when pressed against the wheels they would constitute together with the said flanges a thickness materially equivalent to that of normal flanges. To enable this to be achieved, the flanges of the wheels 1 and 2 are accordingly reduced to about half their normal thickness.

The disk 33, adjacent wheel 1, is axially but not rotatively integral with the tube 7 and therefore participates in the axial displacements of the wheel 2, from which it keeps an invariable distance.

The disk 34, adjacent wheel 2, is axially but not rotatively integral with the sleeve 20 and therefore participates in the axial displacements of the wheel 1, from which it keeps an invariable distance.

The purpose of the disks 33 and 34 is to ensure that the vehicle, when crossing switch gear or grooves in the track, is forced on to the check-rails and that there is no danger of the flanges of the wheels 1 and 2 being forked.

It can be seen from what has been said in the foregoing that the device described measures the track gauge by pressing against the internal surface of the heads of rails heavy-wheel flanges of normal diameter, possessing no delicate part, any more than the rest of the device, nor projecting organs which would be too exposed to damage. The whole unit can be designed so that it is watertight, and it is simple to construct. Finally, it ensures perfect recording of the distance measured and is not affected by any drawback which may result from the measuring vehicle passing over point-rails or any other irregularity of the track.

What I claim is:

1. In apparatus for gauging and recording the distance between railroad tracks of the type in which gauging wheels having peripheral wheel flanges on their inner edges are mounted on separate telescoping axle members which are urged outwardly by spring means, the improvement which consists of means for preventing forking of the gauging wheels comprising a pair of disks of substantially the same diameter as the gauging wheel flanges and means supporting each of the disks adjacent and parallel to the inner surface of one of the wheels, said means supporting each of the disks being connected to the telescoping member which supports the opposite wheel, and each of said disks being maintained at a fixed distance from the opposite gauging wheel and being shiftable with said opposite gauging wheel towards and away from the adjacent gauging wheel.

2. Apparatus for continuously gauging and recording the distance between railroad tracks comprising: a pair of gauging wheels arranged in spaced parallel relationship and cooperable to ride on the rails to be gauged, said wheels having peripheral flanges on their confronting sides cooperable to engage the inner edges of the railheads; an axle assembly including a pair of wheel supporting members each supporting one of said wheels and arranged in telescoping relationship so that they can shift inwardly and outwardly with respect to each other in response to variations in the distance between the tracks and having spring means operatively connected between said members to urge them in an outward direction to maintain the wheel flanges in contact with the inner surfaces of the rails; measuring and recording mechanism operatively connected to said members for measuring and recording variations in the relative positions of said members to indicate variations in distance between the tracks; and means for preventing the forking of the gauging wheels comprising a pair of disks of substantially the same diameter as the gauging wheel flanges, each of said disks being disposed adjacent and parallel to the inner surface of one of the gauging wheels and being connected to and supported by the wheel supporting member which supports the opposite wheel whereby the disk is maintained a fixed distance from the opposite wheel and shifts with the opposite wheel towards and away from the adjacent wheel.

3. Apparatus for continuously gauging and recording the distance between railroad tracks as set forth in claim 2 in which one of the wheel supporting members includes a bracket extending around the wheel and a sleeve disposed around the axle assembly and connected to and supporting the disk disposed adjacent the other wheel.

References Cited in the file of this patent

UNITED STATES PATENTS

| 1,084,760 | Stavdal | Jan. 20, 1914 |
| 2,286,456 | Boettcher | June 16, 1942 |

FOREIGN PATENTS

| 301,961 | Italy | Oct. 15, 1932 |
| 990,308 | France | June 6, 1951 |